United States Patent

Roberts

[15] 3,699,536

[45] Oct. 17, 1972

[54] LOW COST RASTER SCANNED DATA CONSOLIDATION

[72] Inventor: David C. Roberts, Rochester, Minn.

[73] Assignee: International Business Machines Corporation, Armonk, N.Y.

[22] Filed: June 28, 1971

[21] Appl. No.: 157,564

[52] U.S. Cl. ....................340/172.5, 340/146.3

[51] Int. Cl. ....................G06k 9/06

[58] Field of Search .........340/172.5, 146.3; 235/157

[56] References Cited

UNITED STATES PATENTS

| | | | |
|---|---|---|---|
| 3,613,082 | 10/1971 | Bouchard | 340/146.3 MA |
| 3,581,281 | 5/1971 | Martin et al. | 340/146.3 |
| 3,573,730 | 4/1971 | Andrews et al. | 340/146.3 |
| 3,582,898 | 6/1971 | Le May | 340/172.5 |
| 3,543,238 | 11/1970 | Schade | 340/146.3 |
| 3,264,608 | 8/1966 | Gattner et al. | 340/146.3 |
| 3,263,216 | 7/1966 | Andrews | 340/146.3 |
| 3,243,776 | 3/1966 | Abbott et al. | 340/146.3 |
| 3,189,873 | 6/1965 | Rabinow | 340/146.3 |

*Primary Examiner*—Paul J. Henon
*Assistant Examiner*—Mark Edward Nusbaum
*Attorney*—Karl O. Heese et al.

[57] ABSTRACT

Data representing a character received from a raster scanner is simultaneously stored in a serial memory and presented to character dimension and location determining logic. After all of the data representing the character has been stored, the character dimension and location information is converted to an address for retrieving a data consolidation mask from a memory containing a plurality of masks. The data consolidation mask is stored in a second serial memory. The first serial memory and the second serial memory are recycled in synchronism to allow the contents of each to sequentially be presented to logic gates which compare the data in the first memory with the mask in the second memory to generate consolidated data representing the character.

8 Claims, 6 Drawing Figures

INVENTOR.
DAVID C. ROBERTS
BY Karl O. Hesse
AGENT

LOW COST RASTER SCANNED DATA CONSOLIDATION

FIELD OF THE INVENTION

This invention relates to electrical communications in general and more specifically to character recognition systems for use in electrical communications.

DESCRIPTION OF THE PRIOR ART

A character recognition system typically is composed of a scanning means such as a flying spot light source, which scans a document having characters thereon. The intensity of the light reflected from the document will depend upon whether the flying spot is positioned over the paper having a first reflectivity or whether the flying spot light source is positioned over a character having a second reflectivity characteristic. The amount of light reflected from the document will be detected by a photodetection means which will convert reflected light at the second intensity level to an electrical signal at a second voltage level to represent a binary one. In order that the character recognition circuits need not analyze all of the detailed video data representing the entire area scanned by the scanning means, character dimensions and location logic circuits are usually provided to determine the location and the size of the character during a first or prescan. The location and size information derived from the prescan then is used to modify the location and size of the area of the document being scanned during a second or recognition scan to include substantially the area occupied by a character. It is often desirable to further reduce the amount of data representing a character. It is known in the prior art that further data reduction can be obtained by deriving a simple scan pattern for the main recognition scan from the character location and size information provided by the prescan. The necessity of scanning a character twice make these methods of the prior art undesirable. In a low cost mechanical type scanner, the necessity for a prescan and a main recognition scan drastically reduces the speed at which documents can be read. If high speed reading is required, a cathode ray tube is often used. Cathode ray tube scanners necessarily entail a higher cost because they require reasonably sophisticated deflection circuitry including distortion compensation circuits and adjustment circuits. Another problem with cathode ray tube light source is that their reliability and durability is not as great as might be desired. The recent improvements in scanners include scanner having high reliability and reasonable low cost in the form of an array of light emitting diodes and photodetectors, which is mechanically moved along a line of characters. The use of a scanning array increases reliability but does not aid document throughput if more than one character scan is required. Plural scans could, of course, be generated through the use of plural arrays, however, this will increase cost.

SUMMARY OF THE INVENTION

It is an object of this invention to provide an improved data consolidation method and apparatus for consolidating the data from a raster scanned character without sacrificing recognition reliability or speed.

It is a further object of this invention to provide a method and apparatus for consolidating the data from a raster scanned character without requiring plural scanning means or repeated scans of the area of a document being read.

A still further object of this invention is to provide a method and apparatus for selecting that portion of digital data received from a scanning means which represents information detected by the scanning means within the area substantially occupied by a character being recognized and for ignoring that digital data received from the scanning means representing information extracted from other areas of the document being scanned.

An even further object of this invention is to consolidate that data representing the information within the area substantially occupied by a character simultaneously with the selection with that data representing information within the area substantially occupied by the character in an improved low cost scanner.

I accomplish these objects through the use of a novel combination of recirculating serial memories and a mask storage memory under control of logic circuits.

Binary data representing information from an area being scanned by a scanning means is received from the scanning means as a serial binary data bit stream. The binary data bits are stored in a first serial memory. While the data bits are being stored, an accumulating means monitors the data bit stream to recognize and accumulate character dimension and location information relating to a character located within the area of the document being scanned. After an area containing a character has been scanned, the dimension and location information is used to generate the address of a data consolidation mask stored in a read only memory. The selected mask is than stored in a second serial memory. The data in the first serial memory is then recycled in synchronism with the mask in the second serial memory allowing logic circuitry to compare the data to the mask and generate consolidated data representing information from only that area substantially occupied by the character. The consolidated data can be transmitted to a computer for character recognition. If the consolidated data is ambiguous, resulting in the possibility that it might represent more than one unique character, the computer can issue alternate mask instructions to the addressing circuitry to modify the address of the read only memory from which the previous mask was taken thereby allowing the binary data representing information from the area scanned to be compared with different masks under computer control to reduce ambiguity.

DESCRIPTION OF A PREFERRED EMBODIMENT

Figure 1:
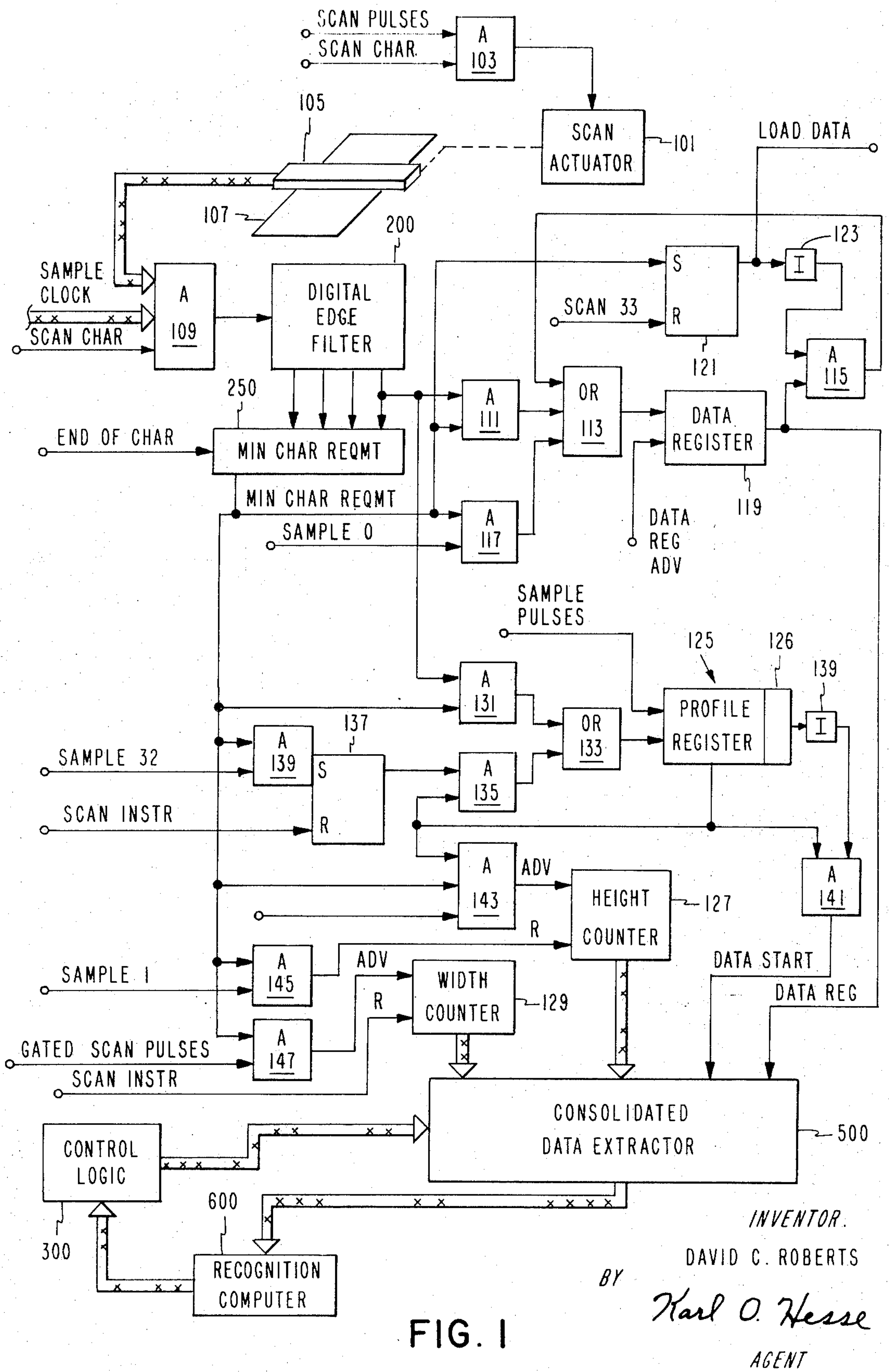
FIG. 1 illustrates an embodiment of the invention in block diagram form.

In order to convert information stored on a document 107 into a stream of digital binary bits, a scanning means is provided and shown in FIG. 1. The scanning means includes an array of light emitting diode-photoconductor pairs 105 connected to and controlled by actuator 101. Array 105 can be a linear array which is physically moved across document 107 in which case actuator 101 would be a mechanical motion actuator. Array 105 can be a matrix array as well, in which case scan actuator 101 would be an electronic switch to sequentially switch rows of the matrix to the output terminals. Scan actuator 101 is advanced by scan pulses through AND gate 103 whenever the scan character latch 301 is set. The scanning means also includes AND GATES 109. Each of AND GATES 109 has a first input connected to the output of a different photodetector of array 105, either directly or through an electronic switch of scan actuator 101. Each of AND gates 109 has a second input connected to a different sample clock output line in order to allow the parallel output of array 105 to be time division multiplexed into a serial binary stream. Each of AND gates 109 has a third input connected to the noninverting output of scan character latch 301 (FIG. 5) so that gates 109 are only open when an area of document 107 is being scanned.

Figure 3:
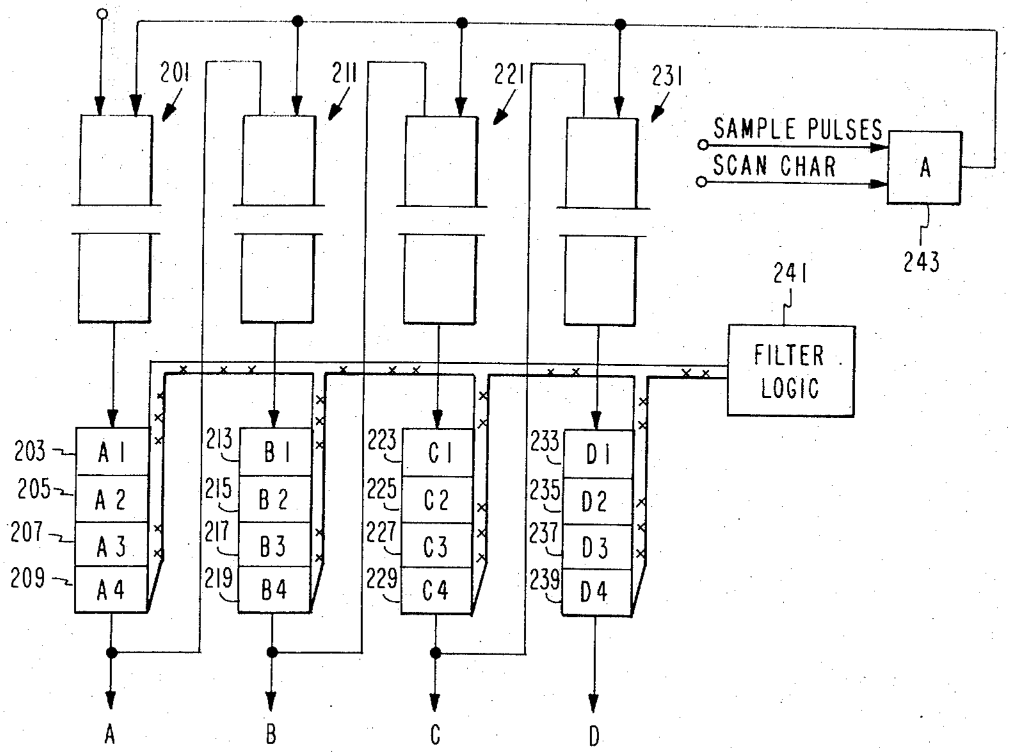
FIG. 3 shows one possible implementation of a digital filter to filter the binary data bit stream as it is received from the scanner.

Referring again to FIG. 1, a digital edge filter 200 is shown connected to the outputs of AND gates 109 for removing extraneous data bits from the binary data as received from the scanning means. As shown in FIG. 3, digital edge filter 200 includes four shift registers 201, 211, 221 and 231 connected in series. Shift registers 201 through 231 each have a shift input connected to the output of AND gate 243. AND gate 243 has a first input connected to the sample pulses output of AND gate 315 (FIG. 5) and a second input connected to the noninvert output of scan character latch 301. The last four stages of each shift register 203–209, 213–219, 223–229, 233–239, has output and DC reset terminals available and connected to filter logic 241. Filter logic 241 is made up of a standard and/or logic implementation of the filter logic algorithm shown in Table 1, below.

TABLE I

Filter Logic Algorithm

| | | |
|---|---|---|
| Reset B2 when | $\overline{A1}\cdot\overline{A2}\cdot\overline{A3}\cdot\overline{B1}\cdot\overline{B3}$ | $\cdot\overline{C1}\cdot\overline{C2}\cdot\overline{C3}$ |
| Reset B2 when | $\overline{A1}\cdot\overline{A2}\cdot\overline{A3}\cdot\overline{B1}\cdot\overline{B3}$ | $\cdot C1\cdot C2\cdot C3$ |
| Reset B2 when | $\overline{A1}\cdot\overline{A2}\cdot\overline{A3}\cdot\overline{B1}\cdot\overline{B3}$ | $\cdot C2\cdot C3\cdot C4$ |
| Reset B2 when | $A1\cdot A2\cdot A3\cdot\overline{B1}\cdot\overline{B3}$ | $\cdot\overline{C1}\cdot\overline{C2}\cdot\overline{C3}$ |
| Reset B2 when | $A2\cdot A3\cdot A4\cdot\overline{B1}\cdot\overline{B3}$ | $\cdot\overline{C1}\cdot\overline{C2}\cdot\overline{C3}$ |
| Reset B2 when | $A1\cdot\overline{A2}\cdot\overline{A3}\cdot B1\cdot\overline{B3}$ | $\cdot C1\cdot\overline{C2}\cdot\overline{C3}$ |
| Reset B2 when | $\overline{A2}\cdot\overline{A3}\cdot B1\cdot\overline{B3}\cdot C1$ | $\cdot\overline{C2}\cdot\overline{C3}\cdot D1$ |
| Reset B2 when | $\overline{A1}\cdot\overline{A2}\cdot A3\cdot\overline{B1}\cdot B3$ | $\cdot\overline{C1}\cdot\overline{C2}\cdot C3$ |
| Reset B2 when | $\overline{A1}\cdot\overline{A2}\cdot\overline{B1}\cdot B3\cdot\overline{C1}$ | $\cdot\overline{C2}\cdot C3\cdot D3$ |
| Reset B3 when | $\overline{A2}\cdot\overline{A3}\cdot\overline{A4}\cdot\overline{B2}\cdot\overline{B4}$ | $\cdot C1\cdot C2\cdot C3$ |
| Reset B3 when | $A1\cdot A2\cdot A3\cdot\overline{B2}\cdot\overline{B4}$ | $\cdot\overline{C2}\cdot\overline{C3}\cdot\overline{C4}$ |
| Reset C2 when | $A1\cdot B1\cdot\overline{B2}\cdot\overline{B3}\cdot C1$ | $\cdot\overline{C3}\cdot\overline{D2}\cdot\overline{D3}$ |
| Reset C2 when | $A3\cdot\overline{B1}\cdot\overline{B2}\cdot B3\cdot\overline{C1}$ | $\cdot C3\cdot\overline{D1}\cdot\overline{D2}$ |

The output of each of shift registers 201 through 231 are available at terminals A, B, C and D respectively. Output D of digital edge filter 200 is the filtered binary data output which will be normalized and consolidated.

Referring again to FIG. 1, a first serial memory means is shown for serially storing the binary data representing a character. The first serial memory means include data register 119, and its associated input and feedback gates and loading latch. Data input AND gate 111 has a first input connected to the D output of digital filter 200 for receiving filtered binary data and has a second input connected to the output of minimum character requirement circuit 250. The output of AND gate 111 is connected to one input of OR gate 113 which is turn connected to the data input of data register 119. The output of minimum character requirement circuit 250 is also connected to the set input of load data latch 121. The reset input of load data latch 121 is connected to scan 33 output of scan clock 309 of control logic 300, shown in detail in FIG. 5. The output of load data latch 121 is connected to inverter 123 which is in turn connected to one input of feedback AND gate 115. The other input of feedback AND gate 115 is connected to the output of data register 119. Load data latch 121 in conjunction with inverter 123 and feedback AND gate 115 acts to open the data recirculation path when new binary data is being loaded into data register 119. Data register 119 is shifted by the data register advance output of oscillator clock frequency divider 305 of control logic 300 shown in FIG. 5.

Figures 2B, 4:
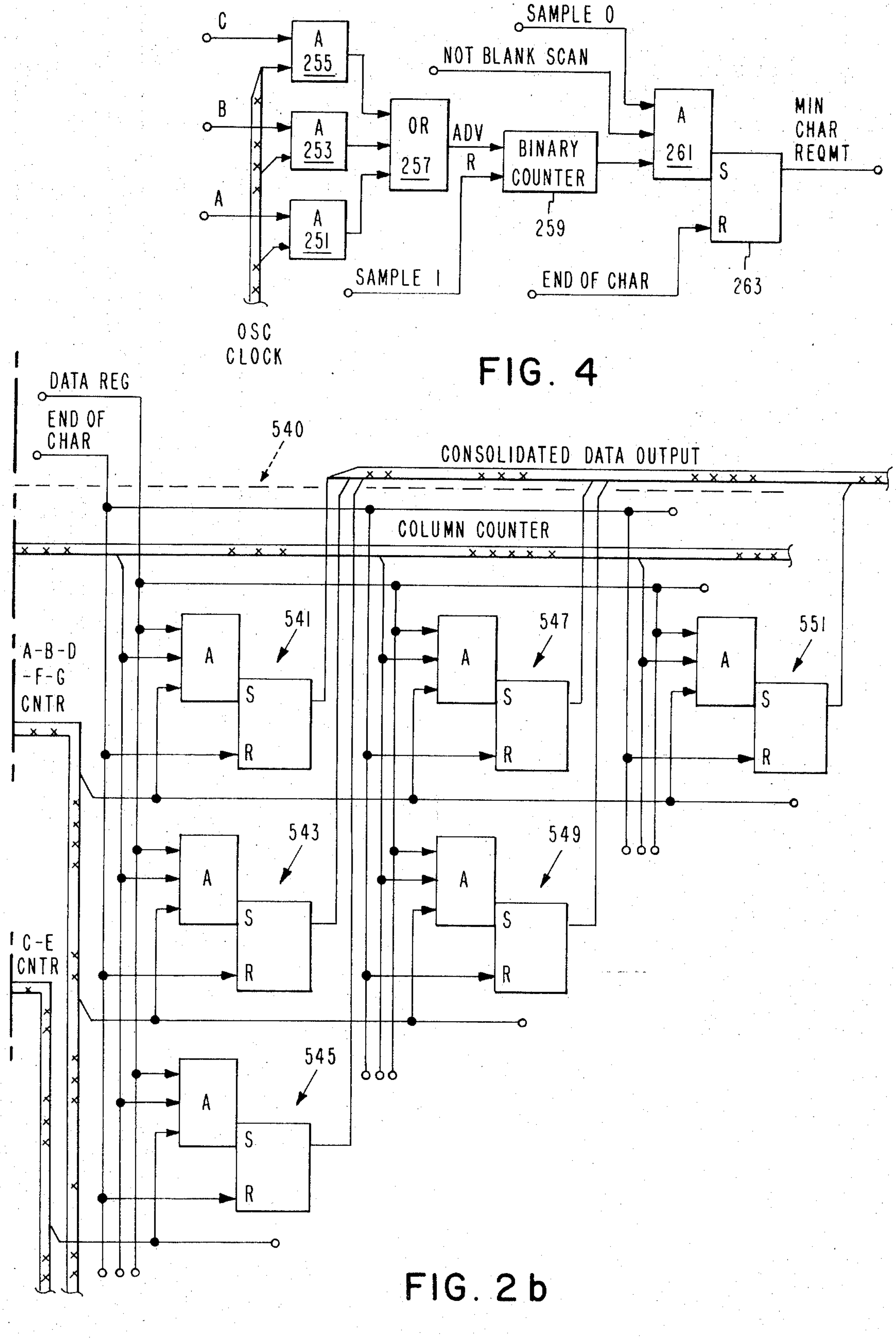
FIG. 4 shows detailed circuitry contained within minimum character requirement block 250 of FIG. 1.

Referring again to FIG. 1, a minimum character requirement logic circuit 250 is shown connected to output A, B, and C of digital edge filter 200. Referring now to FIG. 4, the detailed circuitry of minimum requirement circuit 250 will be described. In order to allow the inspection of the binary data from three scans, multiplexing AND circuits 251, 253 and 255 are provided, each having outputs connected to inputs of OR circuit 257. AND circuit 251 has a first input connected to the A output of digital edge filter 200 and a second input connected to a first time output signal from oscillator clock frequency divider 305. AND gate 253 has a first input connected to the B output of digital edge filter 200 and a second input connected to a second time output of oscillator clock frequency divider 305. AND gate 255 has a first input connected to the C output of digital edge filter 200 and a second input connected to third time output of oscillator clock frequency divider 305. AND gate 255 has a first input connected to the C output of digital edge filter 200 and a second input connected to third time output of oscillator clock frequency divider 305. AND gates 251 through 255 and OR gate 257 act to provide an output pulse at the output of gate 257 for each binary one bit provided at the A, B and C outputs of digital edge filter 200. Binary counter 259 has an advance input connected to the output o OR GATE 257 to receive the generated pulses therefrom and advance binary counter 259. The number of stages within binary counter 259 is chosen so that an over flow or carry pulse will be provided at its output when a minimum threshold number of binary one bits have been received from the scanning means indicating that the area being scanned, includes a character. The carry output of binary counter 259 is connected to a first input of AND GATE 261. A second input to AND GATE 261 is connected to the sample zero output of sample clock 307. A third input to AND GATE 261 is connected to the inverted output of blank scan latch 317. The output of AND GATE 261 is connected to the set input of minimum character requirement latch 263 to set latch 263 whenever the minimum threshold number of binary one bits have been received from the scanning means at sample zero clock time and the scan presently stored in register 231 of digital edge filter 200 is not a blank scan and therefore has part of a character stored therein. Minimum character requirement latch 263 has a reset input connected to the output of end of character trigger 325. The output of minimum character requirement latch 263 provides the output of minimum character requirement circuit 250.

Referring again to FIG. 1, an accumulating means is shown including profile register 125, height counter 127 and width counter 129 along with their controlling gates. Profile register 125 accumulates a profile of the character being scanned from which vertical location information and height information can be derived. Filter digital data is received from the D output of digital edge filter 200 at one input of AND gate 131. The other input of AND gate 131 is connected to the output of minimum character requirement circuit 250. The output of AND gate 131 is connected to an input of OR gate 133 which has an output connected to the data input of profile register 125. Profile register 125 has a shift input for receiving sample pulses from AND gate 315 of control logic 300. Feedback AND gate 135 has a first input connected to the first output of profile register 125 for allowing the content of the register to recirculate. Profile register 125 is only one scan long and therefore will recirculate once for every scan. The other input of AND gate 135 is connected to the output of load profile latch 137. Load profile latch 137 is set by the output of AND gate 139 which has a first input connected to the output of minimum character requirement circuit 250 and a second input connected to the sample 32 output of sample clock 307. Load profile latch 137 has a reset input connected to recognition computer 600 for receiving a scan instruction signal which will reset load profile latch 137 to clear profile register 125 whenever a new area of document 107 is to be scanned. The output of AND gate 135 is connected to another input of OR GATE 133 which is in turn connected to the input of profile register 125 to complete the feedback path. The first output of profile register 125 is connected to a last stage 126 of profile register 125 which in turn provides a second output of profile register 125. This second output is connected to an inverter 139 which is in turn connected to an AND GATE 141. AND GATE 141 has a second input connected to the first output of profile register 125 and generates at its input, a signal whenever a zero bit is stored in stage 126 and a one bit appears at the first output of profile register 125. The output of AND gate 141 is connected to consolidated extractor 500 and is labeled "data start".

Height counter 127 is also part of the accumulations means and acts to accumulate height information of the character being scanned. Height counter 127 has an advance input connected to the output of AND gate 143 which in turn has three inputs. A first input of AND gate 143 is connected to the first output of profile register 125, a second input is connected to the output of minimum character requirement circuit 250 and the third output of AND gate 143 is connected to the output of AND GATE 315 labeled "sample pulses." Height counter 127 is reset at the start of each scan until the end of character has been detected at which time the count then existing in height counter 127 is allowed to remain therein for later use by consolidated data extractor 500. The reset input of height counter 127 is connected to the output of AND gate 145 which has a first input connected to the output of minimum character requirement circuit 250 and a second input connected to the sample one output of sample clock 307. Height counter 127 has outputs connected to consolidated data extractor 500 for providing the accumulated height information to address generator 507, FIG. 2A.

In order to provide accumulated information representing the width of the character being scanned to address generator 507, a width counter 129 is provided with outputs connected to consolidated address extractor 500. Width counter 129 has an advance input connected to AND gate 147 which has a first input connected to the output of minimum character requirement circuit 250 and a second input connected to the output connected to the output of AND gate 308 for receiving gated scan pulses whenever an area of document 107 is being scanned. The output of minimum character requirement circuit 250 allows these scan pulses to accumulate in width counter 129 throughout the period of time when a character is being scanned by the scanning means. When the end of the character has been detected, the minimum character requirement signal will be removed thus inhibiting AND gate 147 to allow the width count accumulated in width counter 129 to remain available for use by address generator 507. Width counter 129 has a reset input connected to recognition computer 600 for receiving a scan instruction signal to reset width counter 129 at the start of scanning of a new area by the scanning means.

Actual consolidation of data is accomplished in consolidated data extractor 500 which receives data from data register 119, character vertical position information in the form of a data start signal from AND GATE 141, character height information from height counter 127, and character width information from width counter 129, as well as control signals from control logic 300 and provides a 5 by 7 matrix of consolidated data at its output. The output of consolidated extractor 500 is connected to a recognition computer 600 for final character recognition. Character recognition computer 600 has output lines for sending instructions such as a scan instruction to initiate scanning of a document, a maximum width instruction for terminating scanning of a document when an area in excess of the maximum character width has been covered by the scanning means, and alternate mask instructions for modifying the addresses generated by address generator 507 to retrieve alternate masks from read only memory 509 in order to reduce ambiguities in the consolidated data received by the recognition computer from consolidated data extractor 500.

Figure 2A:
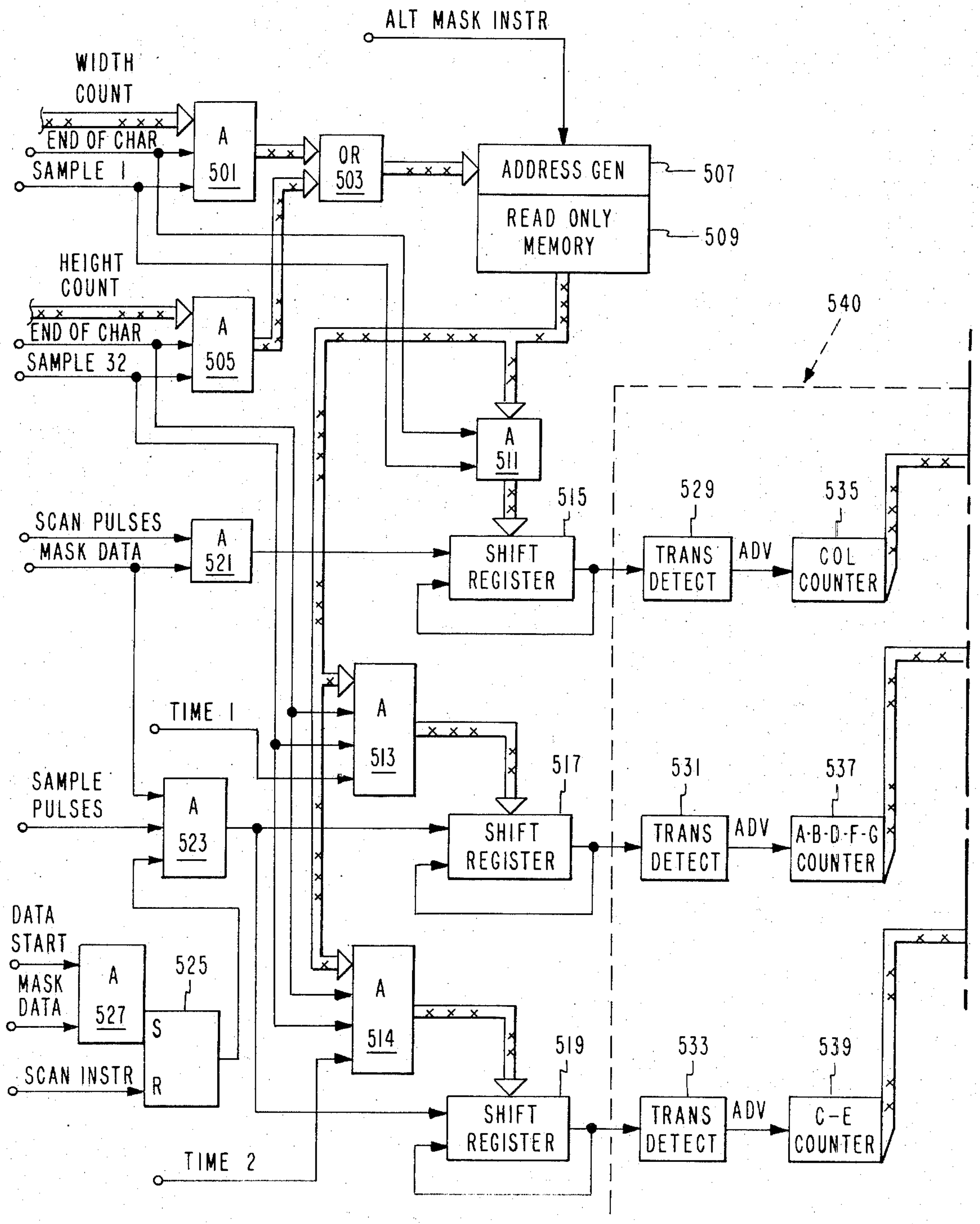
FIGS. 2A and 2B show the logic circuitry contained within the block labeled "consolidated data extractor" of FIG. 1.

Referring now to FIG. 2A, a first portion of consolidated data extractor 500 will be described. In order to address masks stored in read-only memory 509, an addressing means is provided which includes address generator 507, and its associated input gates 501, 503 and 505. Width count input gates 501 each have a first input connected to a different stage of width counter 129, a second input connected to the output of end of character trigger 325, and a third input connected to the sample one output of sample clock 307. The height count input gates 505 each have a first input connected to a different stage of height counter 127, a second input connected to the output of end of character trigger 325 and a third input connected to the sample 32 output of sample clock 307. The outputs of the gates 501 and gates 505 are connected to the plurality of OR gates 503 which are in turn connected to address generator 507 which contains straightforward decoding logic well-known to those skilled in the art for converting first binary numbers in the form of width and height counts to second binary numbers in the form of addresses of memory locations within read-only memory 509. Address generator 507 has another input connected to recognition computer 600 for receiving alternate mask instructions which modify the address generated by address generator 507 whenever such instructions are present. Examples of alternate mask instructions may be in the form of higher order bits causing higher order positions in read-only memory 509 to be addressed when the alternate mask instruction is present to obtain more sophisticated masks from such higher order positions in the memory 509.

In order to provide storage for the plurality of masks used in the consolidation of binary date, read-only memory 509 is provided, having a plurality of outputs for the parallel transfer of masks from read-only memory 509 to second serial memory means including shift registers 515, 517, and 519. The parallel transfer of the horizontal mask is accomplished through AND gates 511, which each have a first input connected to a different output of read-only memory 509, a second input connected to end of character trigger 325 and a third input connected to sample 1 output of sample clock 307. In view of the fact that the data consolidation scheme which has been chosen for the preferred embodiment includes overlapping consolidation regions in the vertical direction, two vertical masks are utilized in consolidation of data. The vertical masks are received from read-only memory 509 through AND gates 513 and 514 which each have a first input connected to a different output of read-only memory 509, a second input connected to the output of end of character trigger 325 and a third input connected to the sample 32 output of sample clock 307. Each of AND gates 513 has a fourth input connected to the time 1 output of oscillator clock 305. Each of AND gates 514 has a fourth input connected to the time 2 output of oscillator clock 305. The outputs of AND GATES 511 are connected to the DC set inputs of different stages of shift register 515 and the outputs of AND GATES are connected to different DC set inputs of shift registers 517 or 519. Shift register 515 has a shift input connected to the output of AND gate 521 which has a first input connected to the output of mask data latch 335 and a second input connected to the scan pulses output of sample clock 307. Shift registers 517 and 519 each have a shift input connected to the output of AND gate 523. AND gate 523 has a first input connected to the sample pulses output of AND gate 315 and has a second input connected to the output of align profile latch 525. The align profile latch has a set input connected to the output of AND gate 527 which has a first input connected to the date start output of MASK DATA LATCH 335. Align profile latch 525 has a reset input connected to the scan instruction line from recognition computer 600. Each of shift registers 515, 517, and 519 have an output connected via a feedback line to a serial data input so that the registers can be recirculated under control of the advance inputs from gates 521 and 523 respectively.

The outputs of shift registers 515, 517 and 519 are also connected to data consolidation logic 540 for comparing masks stored in the registers with binary data stored in data register 119 to provide a matrix of consolidated binary data representing the character in data register 119. The output of shift register 515 is connected to transition detector 529 which provides an output pulse whenever the output binary bits of the mask in shift register 515 change from binary one to binary zero or changes from binary zero to binary one. The output of transition detector 529 is connected to the advance input of with column counter 535 and operates to advance counter 535 whenever a transition from a binary one to zero or binary zero to one occurs at the output of shift register 5.5 The output of shift register 517 is connected to transition detector 531 which provides an output pulse whenever the output binary bits of the mask in shift register 517 change from binary one to binary zero or changes from binary zero to binary one. The output of transition detector 531 is connected to the advance input of with now counter 537 and operates to advance counter 537 whenever a transition from a binary one to zero or binary zero to one occurs at the output of shift register 517.

The output of shift register 519 is connected to transition detector 533 which provides an output pulse whenever the output binary bits of the mask in shift register 519 change from binary one to binary zero or change from binary zero to binary one. The output of transition detector 533 is connected to the advance input of with row counter 539 and operates to advance counter 539 whenever a transition from a binary one to zero or binary zero to one occurs at the output of shift register 519.

Data consolidation logic 540 includes a 5 × 7 matrix of AND gates, having five columns and seven rows labeled 1 through 5 from right to left and A through G from top to bottom respectively. Each AND gate performs a data consolidating comparison between the binary data in the data register and the information embodied in the masks which have been converted to 5 × 7 format by the transition detectors and the counters.

Referring now to FIG. 2B, the detailed description of the circuit connections between the counters and the 5 × 7 gate matrix of data consolidation logic 540 will be set forth. The 5 × 7 matrix includes cells 541 through 551. Each matrix cell has a three input AND gate at the set input of a latch. Each of the latches has a reset input connected to the output of end of character trigger 325 to reset the latches whenever new data has been received in data register 119 or whenever an alternate mask instruction has been received from recognition computer 600. The input connections to the matrix AND gates shown in FIG. 2B will now be described by way of example with the understanding that all of the gates of the 5 × 7 matrix are connected in a similar manner. Each AND gate has a first input connected to the output of data register 119. Each AND gate has a second input connected to an output of column counter 535. Each AND gate also has a third input connected to an output of one of row counters 537 or 539 depending on its position within the matrix. For example, in the upper left corner of the matrix, the second input to the AND gate of cell 541 is connected to the "-five" output of column counter 535 and the third input is connected to the "A" output of row counter 537. The second input of the AND gate of cell 543 is also connected to the "five" output of column counter 535, but the third input is connected to the "B" output of row counter 537. The second input to the AND gate of cell 545 is also connected to the "five" output of column counter 535, but the third input is connected to the "C" output of row counter 539. The remaining cells in the matrix are connected in like manner as indicated by their position in the matrix. The output of each matrix cell is connected to recognition computer 600 for final character recognition. It is recognized that the column and row counters provide time sequential outputs and therefore it is not necessary that each matrix cell contain a latch if the recognition computer can be dedicated to receiving the consolidated data as it is being generated.

Figure 5:
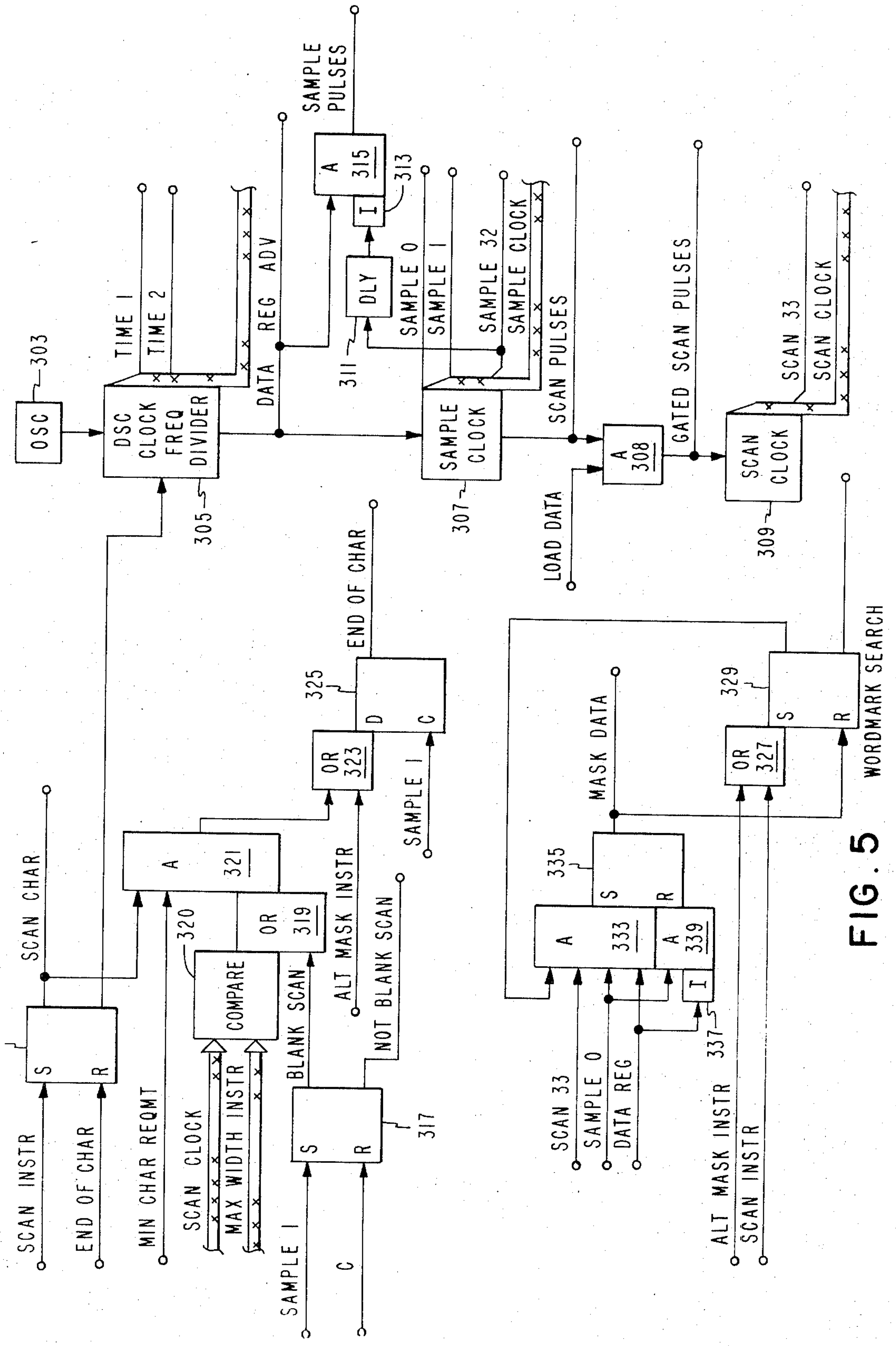
FIG. 5 shows detailed circuitry contained within control logic block 300 of FIG. 1.

Referring now to FIG. 5, the detailed circuitry contained within control logic 300 will be described. In order to initiate scanning action by the scanning means, a scan character latch 301 is provided having a set input connected to the scan instruction output of recognition computer 600 and a reset input connected to the output of end of character trigger 325. The noninvert output of scan character latch 301 is connected to various gates previously described including AND gate 101 and 109 to initiate scanning by the scanning means and filtering by digital edge filter 200.

In order to synchronize the operation of the entire data normalization and consolidation system, an oscillator 303 is provided. The output of the oscillator is connected to the input of oscillator clock frequency divider 305 which contains a conventional binary frequency divider which, for example, provides as a data register advance output a signal of scanning frequency equal to 1/32 that provided at the oscillator clock input. Oscillator clock frequency divider 305 also has an output from each frequency divider stage to generate a sequence of time divided oscillator clock pulses for use by minimum character requirement circuit 250. Oscillator clock frequency divider 305 has a control gate input connected to the inverted output of scan character latch 301 to inhibit operation of some of the binary frequency divider stages of oscillator clock frequency divider 305 whenever scan character latch 301 is not set thereby allowing the data register advance output of oscillator clock frequency divider 305 to provide a signal at a calculation frequency equal to 1/4 that provided by oscillator 303. Any of a number of well-known logic gate connections could be used to implement the above described functional requirements and therefore the detailed circuitry of oscillator clock frequency divider 305 is not disclosed. The data register advance output of oscillator clock 305 is also connected to the advance input of sample clock 307. Sample clock 307 is similar to oscillator clock 305 and it provides a sequence of discrete time separated output pulses sample 0 through sample 32 at its plurality of outputs. Sample 0 pulse time is utilized for word mark storage in data register 119. Sample 1 through sample 32 are used in this embodiment as digitizing sample times for each scan. Only data register 119 has word marks stored therein and no provision has been made for word marks in the masks so the data register 119 must be advanced 33 positions for each scan while the profile register 125 and the mask registers 517 and 519 are only advanced 32 positions for scan. AND gate 315 provides the 32 pulse stream of sample pulses per scan at its output, by not providing an output at sample 0 time. AND gate 315 has a first input connected to the data register advance output of oscillator clock 305 and a second input connected to the output of inverter 313. Inverter 313 has an input connected to the output of delay 311. Delay 311 has an input connected to the sample 32 output of sample clock 307. Delay 311 delays and extends the sample 32 signal by approximately one half sample time period in order to inhibit the output of AND gate 315 at sample 0 time. Sample clock 307 has a scan pulses output to provide an output pulse after each sample 32 time. AND gate 308 is provided to generate a gated scan pulses signal which is only present when an area of document 107 containing a character is being scanned. AND gate 308 has a first input connected to the output of load data latch 123 and a second input connected to the scan pulses output of sample clock 307. The output of AND gate 308 is connected to the advance input of scan clock 309 to advance scan clock 309, which is also similar to oscillator clock 305, only when an area of document 107 containing a character is being scanned and binary data is being loaded into data register 119. Scan clock 309 provides discrete time separated outputs scan 1 through scan 33 on its 33 output lines to control the loading of data into data register 119.

In order to determine when an entire character has been scanned by the scanning means, an end of character trigger 325 and its associated control gates are provided. End of character trigger 325 has a D set gate input and a C clock input. Trigger 325 is set by a pulse at its C input whenever a signal is present at the D input and will be reset by a pulse at its C input whenever a signal is not present at its D input. A signal is provided at the D set gate input of end of character trigger 325 by its connections to the output of OR circuit 325 which has a first input connected to the alternate mask instruction output of recognition computer 600 and a second input connected to the output of AND gate 321. AND gate 321 has a first input connected to the noninvert output of scan character latch 301, a second input connected to the output of minimum requirement circuit 250 and a third input connected to the output of OR gate 319. OR gate 319 has a first input connected to the output of comparator 320 and a second input connected to the noninvert output of blank scan latch 317. Blank scan latch 317 has a set input connected to the sample one output of sample clock 307 and a reset input connected to the C output of digital edge filter 200. Comparator 320 has a first plurality of inputs connected to the outputs of scan clock 307 and a second plurality of inputs connected to the maximum width instruction output of recognition computer 600. Comparator 320 compares the maximum width instruction received from recognition computer 600 with the count in scan clock 309 to provide an output whenever the scanning means has scanned an area equal to the maximum possible character width after an output has been received from minimum character requirement circuit 250.

In order to control the consolidated data extractor 500, a word mark search latch 329 and a mask data latch 335 are provided including their associated control gates. Word mark search latch 329 is set by the output of OR gate 327 which has a first input connected to the alternate mask instruction output of recognition computer 600 and a second input connected to the scan instruction output of recognition computer 600. Work mark search latch 329 has a reset input connected to the output of mask data data latch 335. The output of word mark search latch 329 is connected to a first input of AND gate 333. A second input of AND gate 333 is connected to the scan 33 output of scan clock 309. Third and fourth inputs of AND gate 333 are connected to the sample zero output of sample clock 307 and the output of data register 119 respectively. AND gate 333 provides an output which is connected to the set input of mask data latch 335 to set latch 335 whenever an alternate mask or a scan instruction has been received, data register 119 has been completely loaded with new data and data from the previous character has been completely erased by load data latch 121 and a work mark has been found. Mask data latch 335 is reset by the output of AND gate 339 which has a first input connected to the sample zero output of sample clock 307 and a second input connected to the inverted output of data register 119 through inverter 337. Mask data latch 335 is thus reset at the first absence of a work mark from the output of data register 119.

OPERATION OF THE PREFERRED EMBODIMENT

Having described a preferred embodiment of the invention in detail, its operation in normalizing and consolidating binary data from an example character using example mask configurations will now be described.

Operation is initiated upon receipt of a scan instruction from recognition computer 600 which sets scan character latch 301 and opens AND gates 103, 109, and 243 as well as switching oscillator clock 305 to operate as a frequency divider. Scan pulses through gate 103 then cause scan actuator 101 to scan document 107 with array 105. Sample clock inputs to AND gates 109 multiplex each output of array 105 which for the purposes of this example contains 32 photodetectors, into a serial binary bit stream for filtering in digital edge filter 200. As the binary data stream flows through the serial shift registers 201 through 231, filter logic 241 removes extraneous noise data bits in accordance with the algorithm shown in Table I previously. When sufficient one bits appear at the output A, B, and C of digital edge filter 200 during any one scan, to satisfy the minimum character threshold requirement of circuit 250, AND gate 111 allows digital data representing a character to be serially stored in data register 119. While data is being stored in data register 119, load data latch 121 is set causing AND gate 115 to erase data from a previous character which had been stored in data register 119. While data is being stored in data register 119, AND gate 117 causes a work mark to be written in data register 119 at each sample zero time, so that the data stored in data register 119 can later be located.

Simultaneously with storage of data in data register 119, character dimension and location information is accumulated in profile register 125, height counter 127 and width counter 129. AND gate 131 loads binary data representing a character into profile register 125 which is one scan long. In this embodiment one scan has been chosen to be 32 samples long. AND gate 135 provides a recirculation path so that a superposition of the data from each scan is accumulated in the profile register 125 as it recirculates. Height counter 127 counts the number of one bits in profile register 125 as an indication of the height of the character being scanned. Width counter 129 counts the number of gated scan pulses which will be equal to the number of scans taken by array 105, as an indication of the width of the character.

When a blank scan occurs at the scan clock has advanced to equal the maximum width instruction received from recognition computer 600, end of character trigger 325 is set to halt data loading into data register 125 and inhibit character dimension and location accumulation. The output of end of character trigger 325 also opens gates 501 and 505 in sequence thereby gating the width count and the height count into address generator 507 to address and load horizontal and vertical masks from read-only memory 509 into shift registers 515 and 517, 519 respectively.

For the purposes of example, Tables 2 and 3 below, show one set of possible mask algorithms which can be used in the preferred embodiment of this invention. The mask algorithms shown in Table 2 and 3 are expressed in the form of alternating binary bit patterns when stored in memory 509.

TABLE 2

X1 = Location of consolidation matrix column from right edge of matrix (in number of scans)

X2 = Width of consolidation matrix column (in number of scans)

| Character Width Scan Count | Column Location and Width 1 | 2 | 3 | 4 | 5 |
|---|---|---|---|---|---|
| | X1,X2 | X1,X2 | X1,X2 | X1,X2 | X1,X2 |
| 5 | 0,1 | 1,1 | 2,1 | 3,1 | 4,1 |
| 6 | 0,1 | 1,1 | 2,2 | 4,1 | 5,1 |
| 7 | 0,2 | 2,1 | 3,1 | 4,1 | 5,2 |
| 8 | 0,2 | 2,1 | 3,2 | 5,1 | 6,2 |
| 9 | 0,2 | 2,1 | 3,3 | 6,1 | 7,2 |
| 10 | 0,2 | 2,2 | 4,2 | 6,2 | 8,2 |
| 11 | 0,2 | 2,2 | 4,3 | 7,2 | 9,2 |
| 12 | 0,3 | 3,2 | 5,2 | 7,2 | 9,3 |
| 13 | 0,3 | 3,2 | 5,3 | 8,2 | 10,3 |
| 14 | 0,3 | 3,2 | 5,4 | 9,2 | 11,3 |
| 15 | 0,3 | 3,2 | 5,5 | 10,2 | 12,3 |
| 16 | 0,3 | 3,2 | 5,6 | 11,2 | 13,3 |
| 17 | 0,3 | 3,3 | 6,5 | 11,3 | 14,3 |
| 18 | 0,3 | 3,3 | 6,3 | 12,3 | 15,3 |
| 19 | 0,3 | 3,3 | 6,7 | 13,3 | 16,3 |
| 20 | 0,4 | 4,3 | 7,6 | 13,3 | 16,4 |
| 21 | 0,4 | 4,3 | 7,7 | 14,3 | 17,4 |
| 22 | C,4 | 4,3 | 7,8 | 15,3 | 18,4 |
| 23 | 0,5 | 5,3 | 8,7 | 15,3 | 18,5 |
| 24 | 0,5 | 5,3 | 8,8 | 16,3 | 19,5 |
| 25 | 0,5 | 5,4 | 9,7 | 16,4 | 20,5 |
| 26 | 0,5 | 5,4 | 9,8 | 17,4 | 21,5 |
| 27 | 0,5 | 5,5 | 10,7 | 17,5 | 22,5 |
| 28 | 0,5 | 5,5 | 10,8 | 18,5 | 23,5 |
| 29 | 0,6 | 6,5 | 11,7 | 18,5 | 23,6 |
| 30 | 0,6 | 6,5 | 11,8 | 19,5 | 24,6 |
| 31 | 0,6 | 6,5 | 11,9 | 20,5 | 25,6 |
| 32 | 0,6 | 6,5 | 11,10 | 21,5 | 26,6 |

TABLE 3

Y1 = Location of consolidation matrix row from top of matrix (in number of samples) p1 Y2 = Height of consolidation matrix row (in number of samples)

| Character Height Sample Count | Row Location and Height A Y1, Y2 | B Y1, Y2 | C Y1, Y2 | D Y1, Y2 | E Y1,Y2 | F Y1,Y2, | G Y1,Y2 |
|---|---|---|---|---|---|---|---|
| 6 | 0,1 | 1,1 | 2,1 | 2,2 | 3,1 | 4,1 | 5,1 |
| 7 | 0,2 | 2,1 | 2,1 | 3,1 | 4,1 | 4,1 | 5,2 |
| 8 | 0,2 | 2,1 | 2,2 | 3,2 | 4,2 | 5,1 | 6,2 |
| 9 | 0,2 | 2,1 | 2,2 | 3,3 | 5,2 | 6,1 | 7,2 |
| 10 | 0,2 | 2,2 | 3,2 | 4,2 | 5,2 | 6,2 | 8,2 |
| 11 | 0,2 | 2,2 | 3,2 | 4,3 | 6,2 | 7,2 | 9,2 |
| 12 | 0,3 | 3,2 | 4,2 | 5,2 | 6,2 | 7,2 | 9,3 |
| 13 | 0,3 | 3,2 | 4,2 | 5,3 | 7,2 | 8,2 | 10,3 |
| 14 | 0,3 | 3,2 | 2,3 | 5,4 | 9,3 | 10,2 | 11,3 |
| 15 | 0,3 | 3,2 | 2,3 | 5,5 | 10,3 | 10,2 | 12,3 |
| 16 | 0,3 | 3,2 | 2,3 | 5,6 | 11,3 | 11,2 | 13,3 |
| 17 | 0,3 | 3,3 | 3,3 | 6,5 | 11,3 | 11,3 | 14,3 |
| 18 | 0,3 | 3,3 | 3,3 | 6,6 | 12,3 | 12,3 | 15,3 |
| 19 | 0,3 | 3,3 | 3,3 | 6,7 | 13,3 | 13,3 | 16,3 |
| 20 | 0,4 | 4,3 | 4,3 | 7,6 | 13,3 | 13,3 | 16,4 |
| 21 | 0,4 | 4,3 | 4,3 | 7,7 | 14,3 | 14,3 | 17,4 |
| 22 | 0,4 | 4,3 | 4,3 | 7,8 | 15,3 | 15,3 | 18,4 |
| 23 | 0,5 | 5,3 | 5,3 | 8,7 | 15,3 | 15,3 | 18,5 |
| 24 | 0,5 | 5,3 | 5,3 | 8,8 | 16,3 | 16,3 | 19,5 |
| 25 | 0,5 | 5,4 | 6,3 | 9,7 | 16,3 | 16,3 | 20,5 |
| 26 | 0,5 | 5,4 | 5,3 | 9,8 | 17,4 | 17,3 | 21,5 |
| 27 | 0,5 | 5,5 | 6,3 | 10,7 | 18,3 | 17,5 | 22,5 |
| 28 | 0,5 | 5,5 | 6,3 | 10,8 | 19,3 | 18,5 | 23,5 |
| 29 | 0,6 | 6,5 | 7,3 | 11,7 | 19,3 | 18,5 | 23,6 |
| 30 | 0,7 | 7,5 | 7,4 | 12,6 | 19,4 | 18,5 | 23,7 |
| 31 | 0,7 | 7,5 | 7,4 | 12,7 | 20,4 | 19,5 | 24,7 |
| 32 | 0,7 | 7,5 | 7,4 | 12,8 | 21,4 | 20,5 | 25,7 |

To assist in understanding the operation of the invention, let us assume, for this example, that the character which has been scanned is 18 samples high and 18 scans wide. In this case both height counter 127 and width counter 129 will contain the number 18. The first number in each column of Tables 2 and 3 designates the number of positions to skip before reaching the indicated matrix row or column and the second number indicates the number of positions contained within the indicated row of column. This information will be stored in read-only memory 509 in the form of alternating binary bit patterns. For example, the memory word pattern corresponding to the mask algorithm for a character 18 scans wide is three one bits representing column 1, three zero bits representing column 2, six one bits representing column 3, three zero bits representing column 4, and three one bits representing column 5 followed by a series of zero bits to the end of the memory word. In like manner, the bit patterns stored in memory for a character 18 samples high will be in the form of two words of alternating binary bit patterns. The first word which will be loaded into shift register 517 will have three one bits representing row A followed by three zero bits representing row B followed by six one bits representing row D followed by three zero bits representing row F followed by three one bits representing row G followed by a series of zero bits to the end of the memory word. A second word associated with a height count of 18 will appear in memory 509 containing three one bits indicating an undesignated row followed by three zero bits indicating row C followed by six one bits indicating an undesignated row followed by three zero bits indicating row E followed by three one bits indicating a last undesignated row followed by zero bits out to the end of the memory word. The three words of alternating binary bit patterns are sequentially addressed in memory 509 under control of address generator 507 using the width count and the heighth count as well as outputs from oscillator clock 305 for sequencing purposes. At sample 1 time, the first word is loaded into shift register 515. At time 1 of sample 32, the second word is loaded into shift register 517 and at time 2 of sample 32, the third word is loaded into shift register 519. At the next sample 1 time, end of character trigger 325 will be reset to prevent repeated mask word loading by inhibiting the width count and height count at gates 501 and 505.

The system is now in condition to begin the data consolidation operation. Word mark search latch 329 of FIG. 5 has been set when the scan instruction was first received from recognition computer 600, therefore, AND gate 33 is in condition to recognize the first word mark. The second input of AND gate 333 connected to the scan 33 output of scan counter 309 insures that word marks from a previously scanned character do not erroneously set mask data latch 335. After data register 119 has recirculated once, load data latch 121 will be reset stopping scan clock 309 at scan 33 allowing mask data latch 335 to be set when the first word mark associated with the data representing the character just scanned is received from data register 119. Receipt of the word mark setting mask data latch 335 indicates that the mask stored in shift register 515 is horizontally aligned with the data stored in data register 119. When the first one bit emerges from profile register 125, a data start signal will be received from AND gate 141 to set align profile latch 525 indicating that the data stored in data register 119 is now vertically aligned with the masks stored in shift registers 517 and 519. Shift registers 515, 517, and 519 are now shifted in synchronism through AND gates 521 and 523 with data register 119. The exclusive OR circuits within transition detectors 529, 531 and 533 will provide an output whenever the binary bit patterns in shift registers 515 through 519 change from a stream of ones to a stream of zeros or from a stream of zeros to a stream of ones. Each output of the transition detectors advances column counter 535 or row counters 537 and 539. As counters 535 through 539 advance, the AND gates of each cell are sequentially conditioned so that an output is provided whenever a one bit appears in data register 119. For purposes of explanation, the latch associated with cell 541 will be set if a one bit appears in any of the 9 sample positions located within the 3 scans of column 5 and the 3 sample positions of row A. The AND gate of cell 541 thus consolidates the 9 data bits of data register 119 into a signal data bit at the output of cell 541.

After being received by recognition computer 600, the character represented by the consolidated data is recognized. In the event that an ambiguity was created when consolidating the data, the recognition computer 600 has the option of issuing alternate mask instructions in order to reconsolidate the data still stored in data register 119 using different masks. When an alternate mask instruction is received from recognition computer 600, word mark search latch 329 and end of character trigger 325 are again set to allow reloading and re-synchronization of different masks with the data in data register 119. Alternate mask instruction signals are also connected to address generator 507 to modify the width count and height count numbers provided through AND gates 501 and 505 to generate higher order or different mask addresses in memory 509. After alternate masks have been loaded from memory 509 into shift registers 515, 517, and 519 the consolidation method proceeds to consolidate the data in data register 119 as has been done previously.

While the invention has been particularly shown and described with reference to a preferred embodiment thereof, it will be understood by those skilled in the art that various changes in form and details may be made therein without departing from the spirit and scope of the invention. For example, the outputs of the consolidation AND gates of each consolidation matrix cell could be directly transmitted to a recognition computer without intermediate storage in a latch wherever the recognition computer could be dedicated to receive a relatively slow serial data stream. Other examples include the use of larger or smaller shift registers, data registers, and timing sequences to implement the invention when using different size scan patterns or consolidation matrices.

I claim as my invention:

1. A method for consolidating the amount of data from a raster scanned area without sacrificing recognition reliability comprising the steps of:

a. scanning the area including a character to be recognized;

b. serially storing binary data detected from said area in a first serial memory;

c. accumulating character dimension and location information while said area is being scanned;

d. choosing a data consolidation mask from a plurality to data consolidation masks from a memory; said choice being determined by said dimension and location information and storing said mask in a second serial memory;

e. recycling said first serial memory in synchronism with said second serial memory to sequentially present said data and said mask to logic circuitry for consolidation of said data.

2. The method of claim 1 further comprising the steps of:

f. transmitting said consolidated binary data to a recognition means;

g. receiving an instruction from said recognition means when an ambiguity is detected by said recognition means;

h. choosing a different data consolidation mask from said plurality of data consolidation masks under control of said instruction and said dimension and location information and storing said different data consolidation mask in said second serial memory;

i. repeating steps (e) and (f).

3. The method of claim 2 wherein said serially storing step is accomplished at the document scanning rate; and wherein said recycling step is accomplished at a calculation rate different from said scanning rate.

4. The method of claim 1 wherein said serially storing step is accomplished at the document scanning rate; and wherein said recycling step is accomplished at a calculation rate different from said scanning rate.

5. A method for consolidating the amount of data from a raster scanned area without sacrificing recognition reliability comprising the steps of:

a. scanning the area including a character to be recognized;

b. filtering the binary data detected from said character for removing noise information therefrom;

c. detecting a logical combination of one bits in said binary data indicating the presence of a character;

d. storing a work mark in a first serial memory;

e. serially storing binary data representing said scanned character in said first serial memory following the location of said word mark in said first serial memory;

f. accumulating character dimension and location information while said area is being scanned;

g. addressing a data consolidation mask from a plurality of data consolidation masks from a memory under control of said dimension and location information and storing said mask in a second serial memory;

h. recycling said first serial memory until said word mask is detected;

i. recycling said second serial memory in synchronism with said first serial memory when said location information indicates that said first serial memory has been recycled past said word mark thereby indicating that binary data detected from said character in said first serial memory is in alignment with said data consolidation mask stored in said second serial memory.

6. Apparatus for consolidating data from a raster scanner without sacrificing recognition reliability comprising:

scanning means for scanning an area including a character to be recognized;

first serial memory means connected to said scanning means for serially storing binary data representing said character;

accumulating means connected to said scanning means for accumulating information representing the width, vertical location, and height of said character;

addressing means connected to said accumulation means for covering said width, location, and height information into an address;

memory means connected to said addressing means; said memory means having a data consolidation mask stored at an address generated by said addressing means;

second serial memory means connected to said memory means for receiving said data consolidation mask from said memory means;

data consolidation means connected to said first serial memory means and to second serial means for comparing the binary data stored in said first serial number means with said mask stored in said second serial memory means and providing an output of consolidated binary data representing said character.

7. The apparatus of claim 6 further comprising control means responsive to instructions from a character recognition means, said control means being connected to said scanning means, said first serial memory means, said accumulation means, and said addressing means for initiating the scan of said character on a document, and for altering the address generated by said addressing means, thereby causing a different data consolidation mask to be retrieved from said memory.

8. The apparatus of claim 6, wherein said scanning means includes a filter means for removing extraneous data bits from binary data representing information from said area being scanned.

* * * * *